(12) United States Patent
Knobel

(10) Patent No.: US 6,733,256 B1
(45) Date of Patent: May 11, 2004

(54) DEVICE FOR PRODUCING CONSUMABLES

(75) Inventor: Josef Guido Knobel, Warth (CH)

(73) Assignee: KMB Produktions AG, Felben (CH)

( * ) Notice: Subject to any disclaimer, the term of this patent is extended or adjusted under 35 U.S.C. 154(b) by 0 days.

(21) Appl. No.: 10/031,549

(22) PCT Filed: Jul. 14, 2000

(86) PCT No.: PCT/EP00/06743

§ 371 (c)(1),
(2), (4) Date: Apr. 11, 2002

(87) PCT Pub. No.: WO01/06864

PCT Pub. Date: Feb. 1, 2001

(30) Foreign Application Priority Data

Jul. 21, 1999 (DE) .......................................... 199 34 106

(51) Int. Cl.[7] .......................... F04B 41/06; G01F 11/10
(52) U.S. Cl. ....................... 417/521; 417/415; 417/462; 417/439; 417/490; 222/361; 222/367; 222/425
(58) Field of Search ................................. 417/521, 415, 417/514, 518, 559, 490, 469, 462; 222/255, 361, 367, 425

(56) References Cited

U.S. PATENT DOCUMENTS

| | | | | |
|---|---|---|---|---|
| 3,851,795 A | * | 12/1974 | Anderson | 222/1 |
| 4,341,329 A | * | 7/1982 | Kuemmerer et al. | 417/518 |
| 4,457,348 A | * | 7/1984 | Mueller et al. | 141/1 |
| 5,050,781 A | * | 9/1991 | Cloup | 222/305 |
| 5,108,268 A | * | 4/1992 | Divall | 417/269 |
| 5,673,821 A | * | 10/1997 | Davis et al. | 222/137 |

* cited by examiner

*Primary Examiner*—Justine R. Yu
*Assistant Examiner*—Michael K. Gray
(74) *Attorney, Agent, or Firm*—Bachman & LaPointe, P.C.

(57) ABSTRACT

The invention relates to a device for producing consumables, especially filled chocolates that consist of a coated filling. The aim of the invention is to provide a device for feeding substances of the consumables to nozzles in a controlled manner. To this end, the device is provided with pumps that comprise pump pistons in a pump chamber and at least two pump chambers are located in a pump housing one on top of the other.

14 Claims, 3 Drawing Sheets

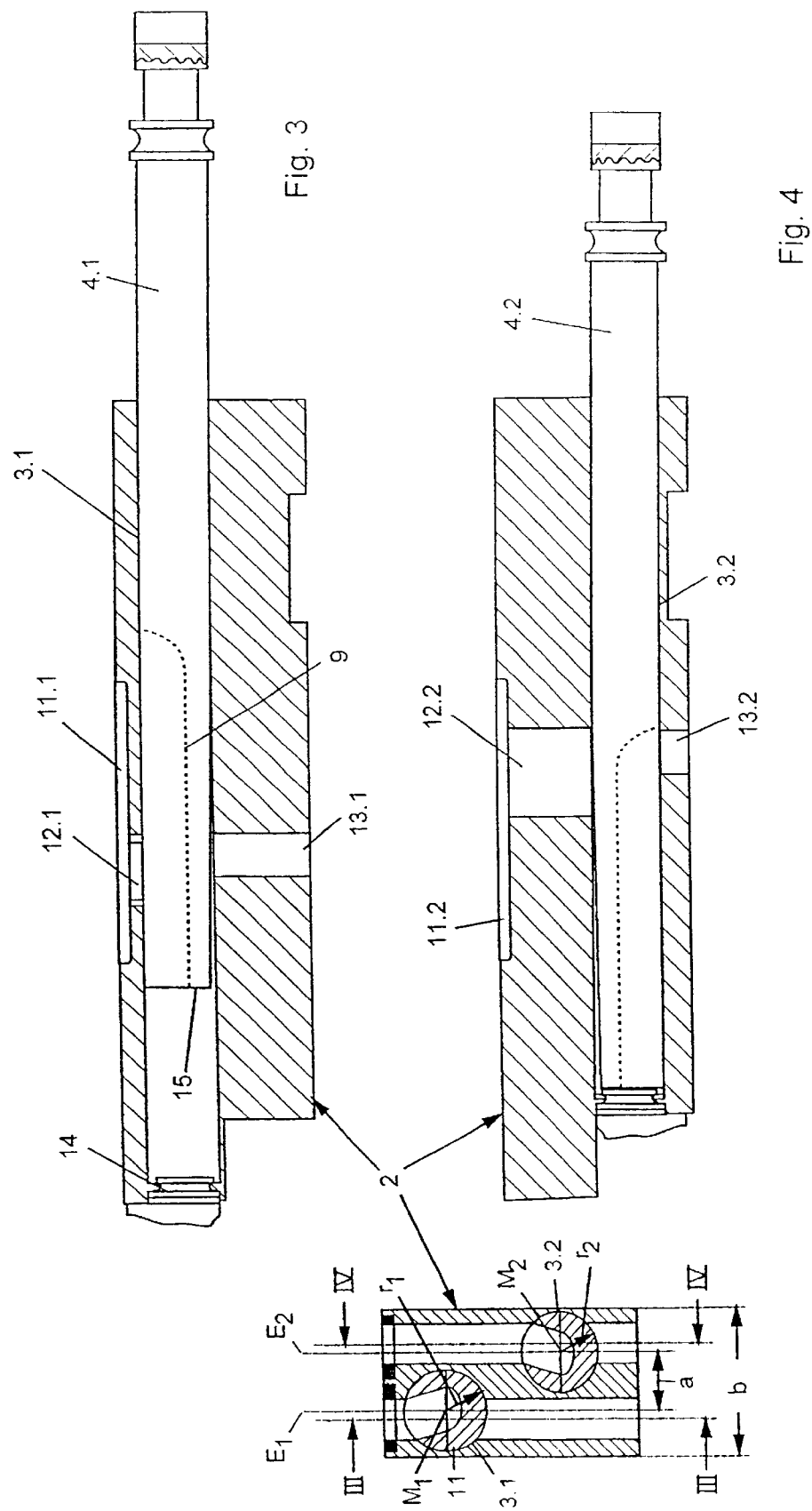

DEVICE FOR PRODUCING CONSUMABLES

The invention relates to an apparatus for producing an edible product, in particular a chocolate, from a filling encased in a coating, pumps with pump rams in a pump chamber being provided for feeding substances of the edible product in a metered manner to nozzles.

Chocolates comprise, for example, a chocolate coating and any desired filling and, nowadays, are industrially produced automatically using so-called one-shot technology. In this method, the chocolate is introduced into a mold through a single nozzle, for example through an annular channel, and a filling is introduced simultaneously through an axial bore, the filling forcing the chocolate coating against the mold wall. A closed-up chocolate comprising a coating with filling is thus produced by a single "shot".

The appropriate substances for the coating and the filling are brought to the nozzles by means of pumps, one pump being assigned to each nozzle on a nozzle bar. These series of pumps are, in turn, connected to a single displacement bar, with the result that the displacement movement of the pump rams is produced by the movement of the displacement bar. Rotary elements are also seated in the displacement bar, and these can rotate the pump ram through 180° in each case.

An apparatus of the type mentioned above is known, for example, from DE 297 06 282 U1. With the arrangement of a multiplicity of pumps one beside the other presented in this document, it has been found that the pumps take up a very large amount of space, with the result that the carriers of the pumps thus also have a considerable weight. Such apparatuses are also known from U.S. Pat. No. 2,195,441 and U.S. Pat. No. 2,771,225.

The object of the present invention, while maintaining the necessary internal diameter of the pump chamber, is to reduce the overall size of the pump arrangement to a considerable extent and thus to cut down on weight and space.

This object is achieved in that at least two pump chambers are arranged one above the other, and are arranged in an offset manner in relation to one another such that a spacing between the vertical planes through the two center axes of the pump chambers is smaller than the sum of the two radii of the pump chambers.

This arrangement of the pump chambers one above the other allows the overlapping of the pump chambers in the vertical plane, with the result that it is possible to reduce the entire pump-housing width, and the overall size of the pumps arranged one beside the other, as a whole, is thus reduced to a considerable extent.

It lies within the scope of the invention also for a plurality of pump chambers to be arranged in a vertically offset manner in relation to one another in a pump housing. In practice, however, a group of two pump chambers has been found to be favorable since this gives greater flexibility for use of the pumps. For example, it is possible for groups of two to be brought out of operation without this adversely affecting the functioning of other adjacent groups of two.

The smallest overall width would be achieved when the pump chambers are located directly vertically one above the other. In this case, however, it is necessary for the substance to be guided from a feed hopper to the nozzles via at least one curved channel, which could possibly be problematic.

It is thus provided within the scope of the invention that the pump chambers are not only arranged in a vertically offset manner, but are also arranged such that they are offset horizontally in relation to one another. In this case, however, in order that the overall size can be kept as small as possible, a spacing between the vertical planes through the two center axes of the pump chambers should be smaller than the sum of the two radii of the pump chambers. The arrangement should be selected such that the two outlet openings lead vertically downward one beside the other. The idea of the invention, however, should cover any arrangement.

It is further preferably provided that the adjacent pump rams in a pump housing may be made to rotate jointly by a drive element. If there are two pump rams, each pump ram has, for example, a gearwheel, the two gearwheels engaging one inside the other. It is sufficient then for one gearwheel to have a rack acting on it.

Overall, it is provided that mutually opposite pump housings are arranged on a carrier, on which the nozzles or a corresponding nozzle bar are/is also secured. For force-distribution reasons, it has proven advisable if the mutually opposite pump chambers are likewise arranged in a vertical offset manner.

Further advantages, features and details of the invention can be gathered from the following description of preferred exemplary embodiments and with reference to the drawing, in which:

FIG. 2 shows a cross section through a pump housing according to the invention;

FIG. 3 shows a longitudinal section through the pump housing according to FIG. 2, along line III—III;

FIG. 4 shows a longitudinal section through the pump housing according to FIG. 2, along line IV—IV.

Figure 1:
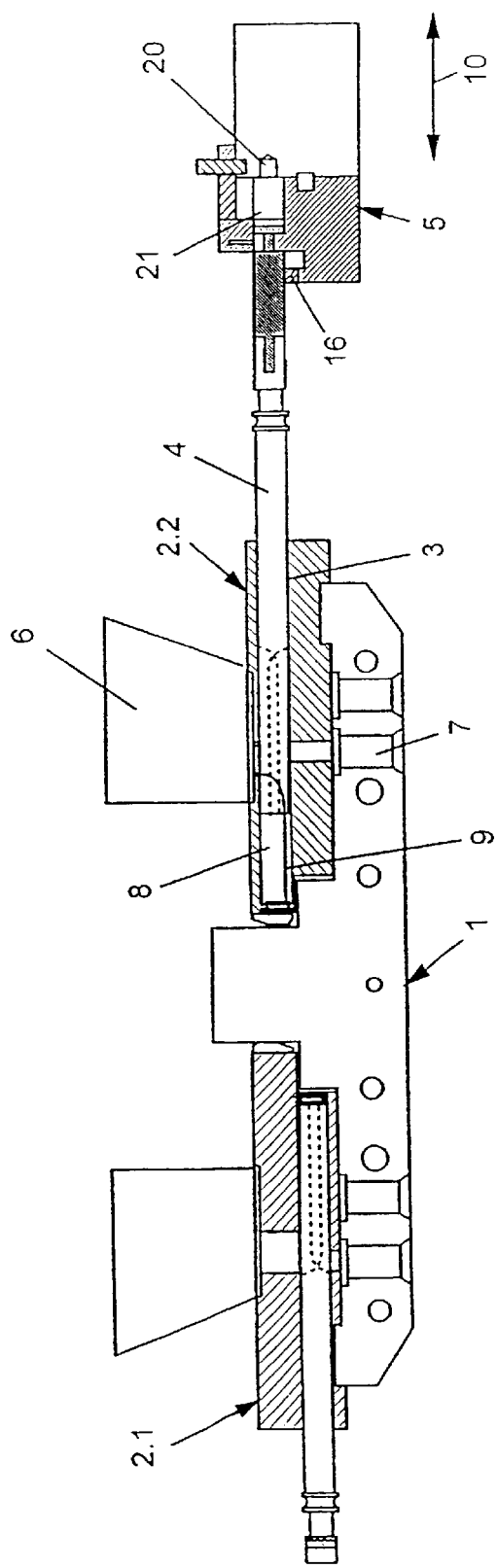
FIG. 1 shows a section through part of an apparatus according to the invention for producing an edible product.

Of an apparatus according to the invention for producing an edible product, FIG. 1 illustrates a carrier 1 which, on the left and right, has a plurality of pump housings 2.1 and 2.2. Located in each pump housing 2.1, 2.2 is a pump chamber 3, in which a pump ram 4 slides. The pump ram 4 is connected to a displacement bar 5.

This arrangement serves for bringing, for example, a filling or a substance for a coating of a chocolate from a feed hopper 6 to a nozzle (not shown specifically), through corresponding channels 7, into the carrier 1. For this purpose, the substance passes from the feed hopper 6 into a metering chamber 8, which is part of the pump chamber 3 and is formed by part of the pump ram 4 being cut away in an axis-parallel manner and by this region being recessed. This produces, in the pump ram 4, a bounded hollow 9, it being possible for a specific quantity of substance to be accommodated between said hollow and an inner wall of the pump chamber 3.

A further specific quantity of substance passes in front of an end surface (not shown specifically) of the pump ram 4 and a base of the pump chamber 3, in which the pump ram 4 slides and can rotate.

As soon as the metering chamber 8 and the space between the base of the pump chamber 3 and the end surface of the pump ram 4 has been filled with substance, the pump ram 4 is rotated through 180° with the result that the hollow 9 is assigned to the channel 7. If the pump ram 4 is then pushed deeper into the pump chamber 3, the space between the end surface of the pump ram 4 and the base of the pump chamber 3 is reduced in size, with the result that the substance passes out of this chamber into the channel 7. Since the channel 7 is connected to a nozzle via channels which are not shown specifically, a correspondingly metered quantity of substance is introduced, for example, into a mold in each case.

The necessary displacement of the pump ram 4 is produced by the displacement bar 5, which can move in the direction of the double arrow 10. The hydraulic or pneumatic equipment which is necessary for this purpose is not shown specifically.

According to the invention, a plurality of pump housings 2 are seated one beside the other on the carrier 1, one pump housing 2 being illustrated in cross section in FIG. 2. There are preferably two pump chambers 3.1 and 3.2 located in each pump housing 2, the pump chambers 3.1 and 3.2 being located vertically one above the other. Each pump chamber 3.1 and 3.2, in turn, has a center axis $M_1$ and $M_2$ which are arranged in a vertical plane $E_1$ and $E_2$, which maintain a spacing a from one another. This spacing a is smaller than the sum of the two radii $r_1$ and $r_2$ of the pump chambers 3.1 and 3.2. It is possible here to keep the width b of the pump housing 2 as small as possible.

A top pump ram 4.1 can be gathered from FIG. 3, and a bottom pump ram 4.2 can be gathered from FIG. 4. Introduction openings 12.1 and 12.1 (first and second material inlets) open out into the respective pump chambers 3.1 and 3.2 from above, each following a cutout 11.1 and 11.2 for the positioning of a feed hopper 6, said introduction openings, in turn, being assigned outlet openings 13.1 and 13.2 (first and second material units) on the other side.

In FIG. 3, the pump ram 4.1 is located in its receiving position, in which substance can be introduced, through the introduction opening 12.1, into the hollow 9 and into the interspace between the base 14 of the pump chamber 3.1 and the end surface 15 of the pump ram 4.1.

In order to eject the substance, the pump ram 4.2, as shown in FIG. 4, is rotated through 180° and pushed forward in the direction of the base 14, with the result that the substance can flow out through the outlet opening 13.2.

Figure 5:
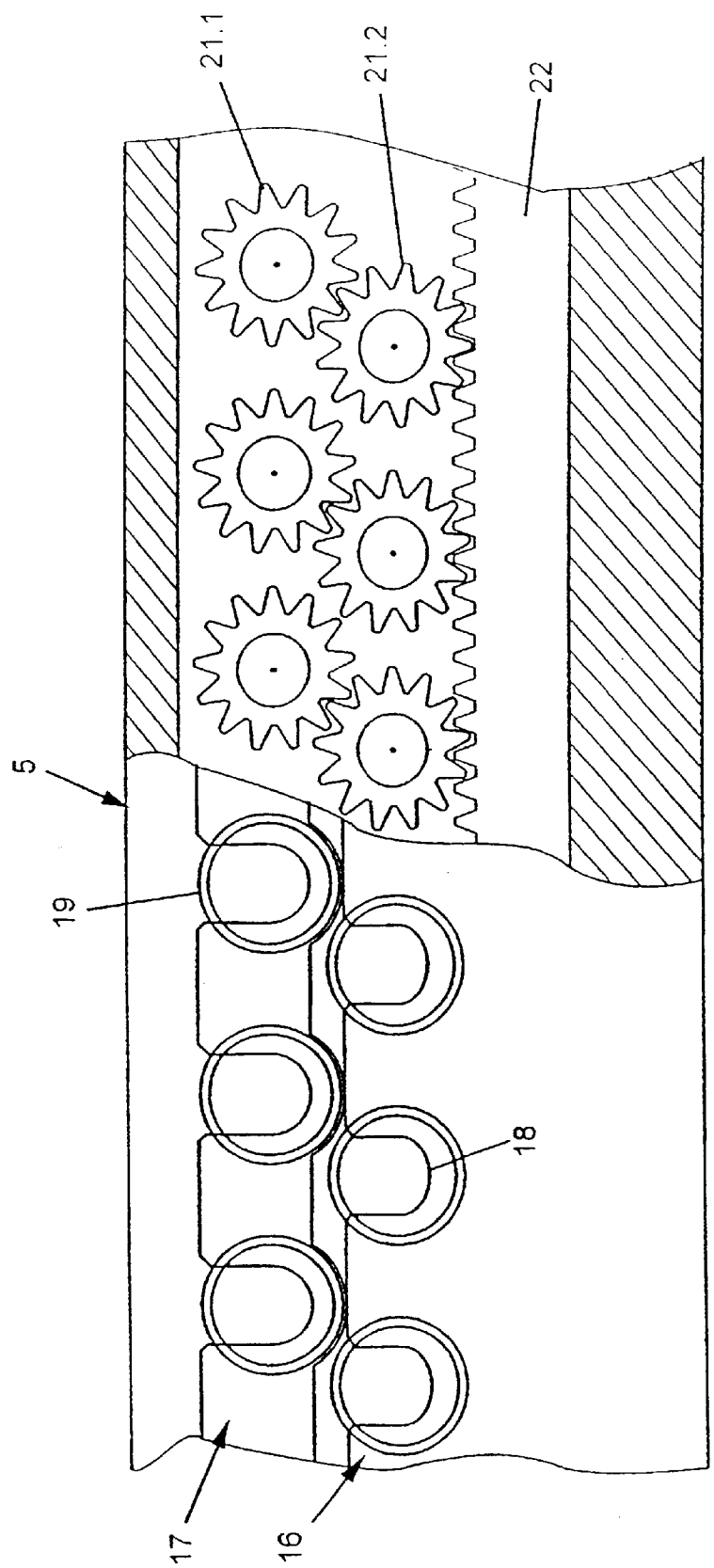
FIG. 5 shows, on the left-hand side, an enlarged front view of part of a displacement bar and, on the right-hand side, an enlarged, sectional rear view of the displacement bar.

In order to accommodate and secure the pump rams 4 on the displacement bar 5, according to FIG. 5 and FIG. 1, two border strips 16 and 17 are arranged in a vertically offset manner and each has bearing hollows 18 formed in them. These bearing hollows serve for accommodating and securing the respective pump rams 4, said rams pushing through an opening 19 in the displacement bar 5 and projecting out in the rearward direction. A gearwheel 21 is positioned on a corresponding end part 20 of each pump ram 4, it being the case that, as can be seen in FIG. 5, the gearwheels 21.1 and 21.2 of the pump rams 4.1 and 4.2 of each pump arrangement engage one inside the other. Furthermore, a rack 22 meshes with one gearwheel 21.2 in each case, with the result that this arrangement ensures that the gearwheels 21.1 and 21.2 are rotated jointly and simultaneously through 180° in each case, but in different directions of rotation.

What is claimed is:

1. A dispensing apparatus comprising:
    a pump housing having a first material inlet, a second material inlet, a first material outlet, and a second material outlet;
    a first pump chamber and a second pump chamber, wherein the first pump chamber and the second pump chamber are arranged side by side in the pump housing;
    a first metering pump ram and a second metering pump ram mounted in the first pump chamber and the second Dump chamber, respectively;
    means for simultaneously rotating the first metering pump ram and the second metering pump ram between a first position where the first pump chamber is associated with the first material inlet and the second pump chamber is associated with the second material outlet and a second position where the first pump chamber is associated with the first material outlet and the second pump chamber is associated with the second material inlet; and
    drive means for reciprocally moving the first and second metering pump rams in opposite directions, wherein when the first pump chamber receives material through the first material inlet, the second pump chamber dispenses material through the second material outlet, and, when the first pump chamber dispenses material through the first material outlet, the second pump chamber receives material through the second material inlet.

2. The apparatus as claimed in claim 1 wherein the first and second pump chambers have a spacing (a) between vertical planes ($E_1$, $E_2$) through two respective center axes ($M_1$, $M_2$) of the first and second pump chambers which is smaller than the sum of two respective radii ($r_1$, $r_2$) of the first and second pump chambers.

3. The apparatus as claimed in claim 1, wherein the first and second pump rams are connected jointly to a drive element.

4. The apparatus as claimed in claim 3, wherein each pump ram has a gearwheel wherein the gearwheels engage one another and one of the gearwheels engages a toothed rack.

5. The apparatus as claimed in claim 1, wherein a plurality of pump housings are arranged opposite one another on a carrier and include mutually opposite pump chambers.

6. The apparatus as claimed in claim 5, wherein the mutually opposite pump chambers are arranged in a vertically offset manner on the carrier.

7. The apparatus as claimed in claim 1, wherein each of the first metering pump ram and the second metering pump ram is provided with a respective hollow.

8. A dispensing apparatus comprising:
    a pump housing having at least one material inlet and at least one material outlet;
    a first pump chamber and a second pump chamber, wherein the first pump chamber and the second pump chamber are arranged side by side in the pump housing;
    a first metering pump ram and a second metering pump ram mounted in the first pump chamber and the second pump chamber, respectively;
    means for simultaneously rotating the first metering pump ram and the second metering pump ram between a first position, where the first pump chamber is associated with a material inlet function and the second pump chamber is associated with a material outlet function, and a second position where the first pump chamber is associated with the material outlet function and the second pump chamber is associated with the material inlet function; and
    drive means for reciprocally moving the first and second metering pump rams in opposite directions so that when one pump chamber of the first and second pump chambers is receiving material, the other pump chamber of the first and second pump chambers is dispensing material.

9. The apparatus as claimed in claim 8 wherein the first and second pump chambers have a spacing (a) between vertical planes ($E_1$, $E_2$) through two respective center axes ($M_1$, $M_2$) of the first and second pump chambers which is smaller than the sum of two respective radii ($r_1$, $r_2$) of the first and second pump chambers.

10. The apparatus as claimed in claim 8, wherein the first and second pump rams are connected jointly to a drive element.

11. The apparatus as claimed in claim 10, wherein each pump ram has a gearwheel wherein the gearwheels engage one another and one of the gearwheels engages a toothed rack.

12. The apparatus as claimed in claim 8, wherein a plurality of pump housings are arranged opposite one another on a carrier and include mutually opposite pump chambers.

13. The apparatus as claimed in claim 12, wherein the mutually opposite pump chambers are arranged in a vertically offset manner on the carrier.

14. The apparatus as claimed in claim 8, wherein each of the first metering pump ram and the second metering pump ram is provided with a respective hollow.

\* \* \* \* \*